FREQUENCY RESPONSIVE PRINTING SYSTEM

Filed Oct. 10, 1960 4 Sheets-Sheet 1

INVENTOR
HANS P. LUHN
BY
Roy C. Hopgood
ATTORNEY

INVENTOR
HANS P. LUHN
BY
Roy C. Hopgood
ATTORNEY

INVENTOR
HANS P. LUHN
BY
Roy C. Hopgood
ATTORNEY

INVENTOR
HANS P. LUHN
BY
Roy C. Hopgood
ATTORNEY

United States Patent Office 3,109,058

Patented Oct. 29, 1963

3,109,058

FREQUENCY RESPONSIVE PRINTING SYSTEM

Hans P. Luhn, Yorktown Heights, N.Y., assignor to International Business Machines Corporation, New York, N.Y., a corporation of New York Filed Oct. 10, 1960, Ser. No. 61,697
11 Claims. (Cl. 178—6.6)

This invention, generally, relates to character producing facsimile apparatus and, more particularly, to an apparatus adapted to present information in legible characters.

Increased use is being made of data processing machines in today's business world, and as a result, an acute need has arisen for a means of communication between man and machine. The problem primarily is to provide such a communication means which is characterized by simplicity of both mechanism and operation.

In the past, it has only been required that man communicate with man, and the dial telephone has become recognized as an economical and convenient means for this purpose. Moreover, the telephone is a relatively simple, uncomplicated mechanism, but it has not been practical as a means by which man may communicate with a machine.

An example of a machine with which man communicates today is a data processing machine in the field of passenger reservations for airlines, railways and the like. Such machines are located centrally and must be interrogated repeatedly from many hundred, remotely located ticket offices. Due to this great number of remote, interrogating locations, a practical communication means also must be inexpensive.

It is a principal object of this invention to provide a new and improved character producing facsimile apparatus.

Another object of the invention is to provide a character writing means which is uncomplicated structurally and relatively economical in manufacture.

Still another object of the invention is to provide a new and improved apparatus to present information in legible characters after transmission.

A further object of the invention is to provide a printing mechanism operable in response to information in the form of electric current frequencies to print legible characters.

Briefly, the invention contemplates the coupling of each of a plurality of frequency responsive elements with a printing element; each of the frequency responsive elements being tuned to a predetermined frequency. Suitable means such as a plurality of rollers are positioned to move a carrier such as electrically sensitive tape adjacent the printing elements whereby those frequency responsive elements which are activated cause their corresponding printing elements to produce marks on the surface of the carrier, and the pattern of these marks is arranged to provide a legible character.

A communication system in accordance with the invention, therefore, provides a control mechanism of any degree of complexity located at the information center, and any number of the relatively simple writing apparatus are at remote locations.

A complete understanding of the above-mentioned and other features and objects of this invention and the manner of attaining them will become more apparent and the invention itself will be best understood by reference to the following description of an embodiment of the invention taken in conjunction with the accompanying drawings, wherein.

Figure 1:
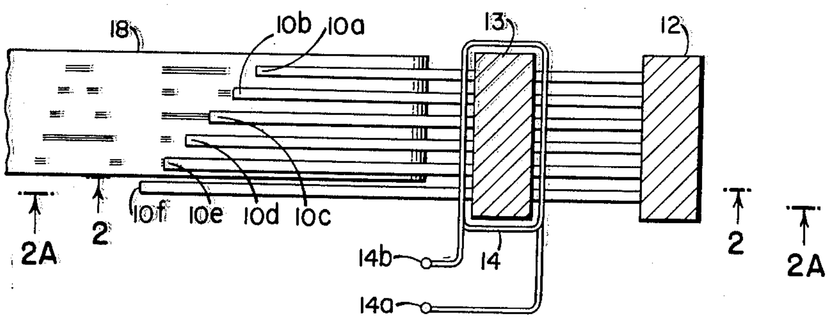
FIG. 1 is a top sectional view of a frequency responsive printer.
Figure 2:
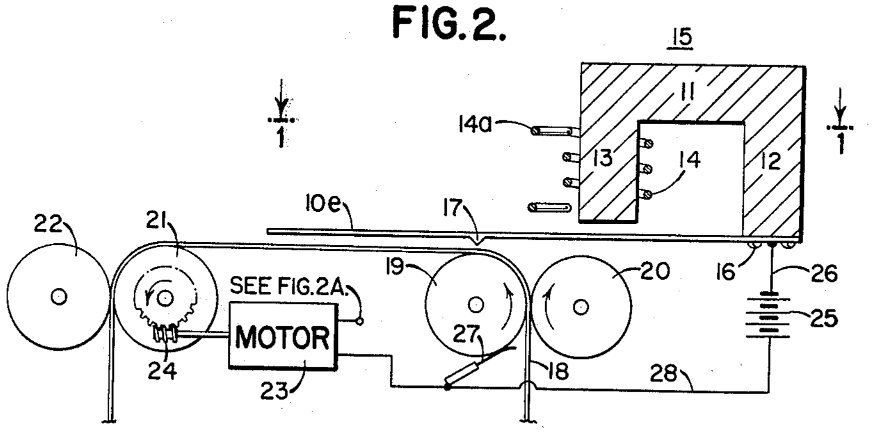
FIG. 2 is a sectional view of the printer taken along the line 2—2 in FIG. 1.

Referring now to FIGS. 1 and 2, a plurality of reeds 10a–10f are arranged in spaced, parallel relationship in a plane perpendicular to legs 12 and 13 of a U-shaped magnetic core 11. One end of each reed is attached to the leg 12 by suitable means, such as the screws 16, so that all of the reeds extend contiguously past the other core leg 13. An electrical winding or coil 14, having terminals 14a and 14b, is wound around the leg 13, so that the core 11 along with the coil 14 form an electromagnet 15.

A stylus 17 is formed integrally with only the reeds 10a–10e for printing purposes as will be explained in greater detail presently. The reeds are formed of a springy, magnetically conductive material, and each reed is tuned to respond to a different predetermined frequency by varying its length.

The reeds may also be tuned by other means, however. For example, the reeds may be the same length, and a weight may be secured on each reed at a specific position along its longitudinal axis, the position and mass of each weight being related to the frequency of response desired for that reed. In this manner, the effective length of a reed is established to control the frequency at which the reed responds.

A carrier 18, which is a strip of paper or the like, is drawn upwardly from a supply reel (not shown) and directed partially around a support roller 19. An idler roller 20 is positioned to maintain the carrier 18 in close contact with the support roller 19.

A drive roller 21 is spaced from the support roller 19, and the carrier 18 is maintained in close contact with the drive roller 21 by pressure from a follower roller 22. Power is supplied to drive the roller 21 by a motor 23 and a worm gear mechanism 24, or alternatively, by a ratchet on the reed 10f, as will be explained hereinafter.

It should be noted that the roller 19 is positioned so that the carrier is in close proximity to each of the styluses 17 on the reeds 10a–10e. In this way, as any one of the reeds 10a–10e is vibrated, its respective stylus 17 contacts the carrier intermittently. When the electromagnet 15 is energized by selected frequencies applied to the coil 14, only those reeds which are tuned to respond to the applied frequencies will be vibrated.

A source of direct current, illustrated by a battery 25, is provided to supply energy from one terminal through a lead 26 to all of the reeds 10a–10f. The other terminal of the battery 25 is connected through a lead 28 to a contact brush 27 and then to one terminal of the motor 23. The roller 19, which is electrically conductive, serves to connect the carrier 18 with the lead 28. Normally, the circuit between the roller 19 and each of the styluses 17 is open since the styluses are not vibrating. However, when a reed vibrates, the electrical circuit is completed, and the stylus on that reed prints on the carrier.

Figure 2A:
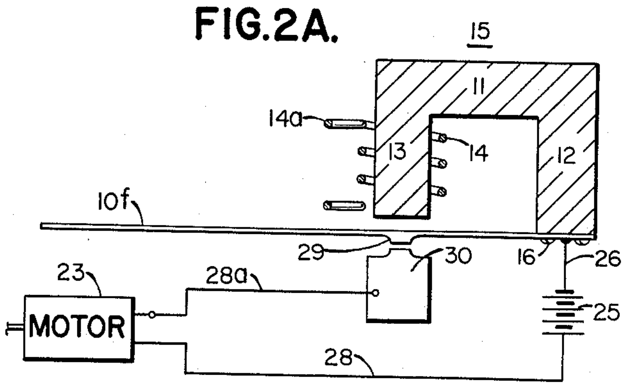
FIG. 2A is a sectional view of the printer of FIG. 1 taken on the line 2A—2A.

The reed 10f (FIG. 2A) rather than being provided with a stylus, is equipped with a contact button 29 which is positioned in close proximity to a terminal 30 connected to the motor 23 by a lead 28a. The other side of the motor 23 is connected through the lead 28 to the battery 25. The reed 10f is tuned to vibrate at a specific frequency to close the contacts 29 and 30 to complete the circuit to the motor 23 for a time duration sufficient to advance the carrier 18 a distance to print a character plus a space. Therefore, the particular frequency to vibrate the reed 10f is included with all other related information frequencies applied to the coil 14.

As mentioned previously, a separate internal power source to move the carrier 18 may be eliminated by replacing the contact 29 with a ratchet (not shown) to coact with a suitable gear so that the carrier 18 is advanced by the vibrating reed 10f.

Preferably, the carrier 18 is a strip of electrically conductive paper which is coated on one side with a heat sensitive layer, so that upon contact of a stylus, the coating is destroyed, leaving a mark. Paper of this type is commercially available under the trade name of Teledeltos. Of course, other types of carriers 18 may be utilized also. For example, litmus paper, which is discolored by electric current, and pressure sensitive paper may also be employed.

A further alternative for the carrier 18 is provided by placing carbon paper in face-to-face relationship with a sheet of ordinary paper. In this circumstance, it is not necessary to provide an electrical circuit between the reeds and the carrier since the contact of the stylus of a vibrating reed on the carbon paper is sufficient to print on the ordinary paper.

There is still another alternative for marking the carrier which does not require that the stylus actually contact the carrier. This is accomplished by adjusting the reeds 10a–10e so that a larger gap is provided between each stylus 17 and the carrier 18. When the gap narrows to a predetermined distance, as a reed vibrates, printing on the carrier is accomplished by an arc across the gap.

In operation, as one or more of the reeds is vibrated by energizing the electromagnet at a particular frequency or frequencies through the coil 14, the stylus on the selected reed or reeds repeatedly contacts the carrier 18. As the carrier 18 advances, one or more lines of spaced marks results on the carrier 18 as the circuit between the stylus and the carrier 18 is closed intermittently. Therefore, by energizing the electromagnet with a composite frequency and thereby controlling the vibratory response of selected ones of the reeds 10a–10e, a particular character is marked out on the advancing tape carrier, see FIG. 1. By repeating this process any number and kind of characters may be printed.

Figure 3:
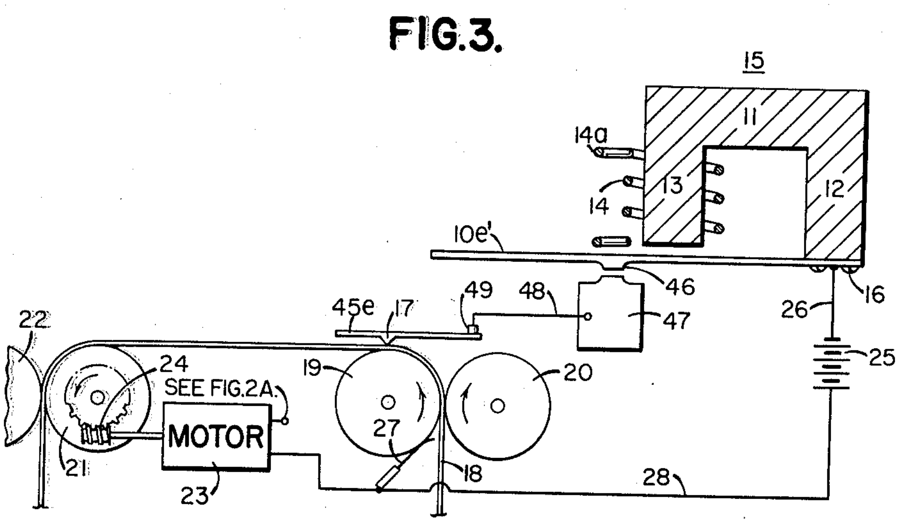
FIG. 3 is a side sectional view of a modified form of a frequency responsive printer.

An alternative arrangement of the printing mechanism provides for the replacement of the styluses 17 on the vibrating reeds 10a–10f by contacts similar to the contacts 29 and 30 which have been described previously. Referring to FIG. 3, a contact 46 is formed integrally on each vibrating reed, one of which is shown at 10e'. Each contact 46 is spaced from a complementary contact 47 which, in turn, is connected by a lead 48 to a terminal 49 on a non-vibrating and stationary support, one of which is indicated at 45e. Each support has a stylus 17 integrally formed with it and in contact with the carrier 18. Printing occurs only when the contacts 46—47 are closed as a result of the vibratory response of a reed to the energization of the electromagnet 15.

Figure 4:
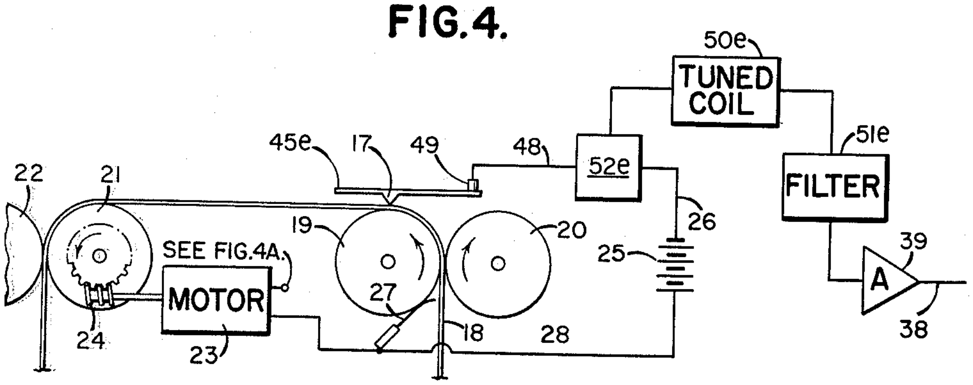
FIG. 4 is a side setional view of a second modified form of a frequency responsive printer.

In another arrangement as shown in FIG. 4, the vibratory action of the reeds may be replaced by electrical means, such as tuned coils, one of which is indicated at 50e. In this form of the printing mechanism, the circuit from the source 25 to each of the styluses is completed through a normally open switch, one of which is shown at 52e. Electric current is supplied to a stylus from the source 25 in response to the energization and resonating of the corresponding tuned coil. Each tuned coil is energized by frequency information which is provided from an amplifier 39 through individual filter circuits, one of which is shown at 51e, the information having been applied to the amplifier 39 by way of a communications link 38, as shown better in FIG. 5. When a frequency-selected tuned coil is energized, the corresponding normally-open switch closes to permit current to flow to that stylus to print.

Figure 5:
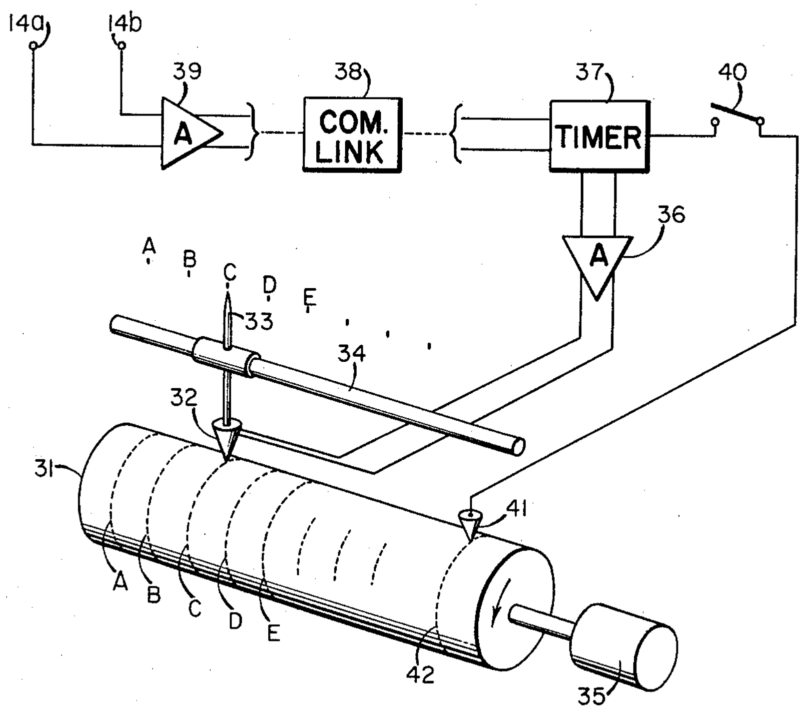
FIG. 5 is a perspective view of one form of an information storage device for a frequency responsive printer and the communication link for the two.

The energizing information for the printing mechanism may be supplied in the form of various, preselected frequencies from a central information location. If the information center is located at the same station as the printer, the information may be fed directly to the printing mechanism. However, if the printer is located at one station and the information center is located at a remote control station, the information is fed over a communications link 38 from the remote station to the printing station. Regardless of communications link, however, the characters which are to be printed are recorded, in one form of the invention, in magnetic recording tracks on a magnetic drum 31 (as shown in FIG. 5).

The drum 31 is provided with as many tracks as there are characters to be printed; each track having the individual frequency response patterns of the respective reeds 10a–10e to produce specific characters.

Figure 4A:
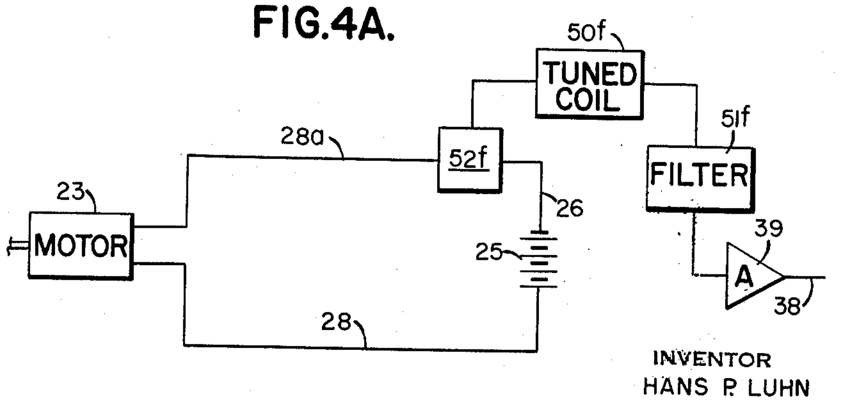
FIG. 4A is a schematic diagram of an indexing control circuit for the form of FIG. 4.

Each track on the drum 31 also includes the frequency necessary to cause reed 10f (FIG. 2A) to vibrate or to cause the coil 50f to resonate closing the switch 52f (FIG. 4A). The circuit to operate the motor 23 is completed causing the carrier 18 to advance while printing each character plus a space. Therefore, track A on drum 31 corresponds to the character A; track B to the character B, etc.

Figure 6:
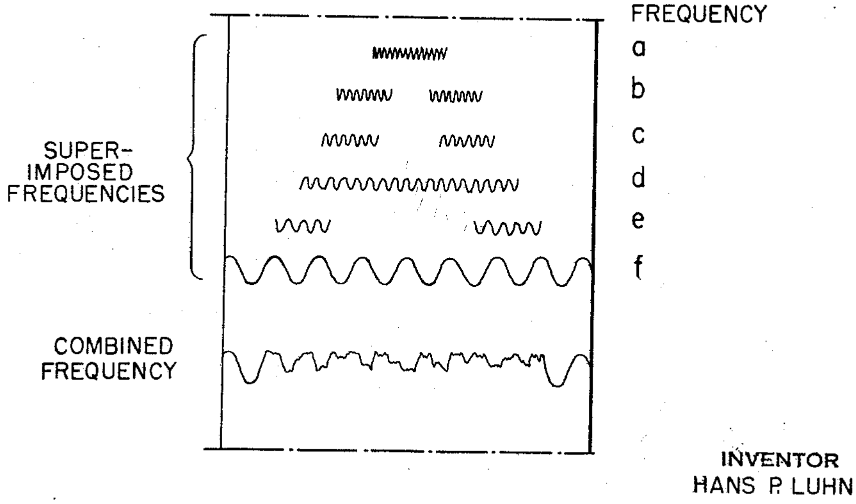
FIG. 6 is a chart showing how the information is stored in the device of FIG. 5.

The characters are prerecorded on the drum (as diagrammatically shown in FIG. 6) by admitting the selected frequencies to a mixer (not shown) at the proper times and for the proper duration. The specific frequency necessary to complete the carrier advancing motor circuit is admitted also to the mixer for each track of the drum 31. The composite mixed frequency is then transferred to a recording head to be prerecorded on the drum 31.

Referring again to FIG. 5, a magnetic reading head 32 is associated with the drum 31 and is displaced in an axial direction with respect to the drum 31 by sliding it along a bar 34. A selector 33 moved in conjunction with the head and along an index of characters corresponding to the specific track on which reading head 32 is acting.

In order to send a message to the printing mechanism, a particular character is selected from the index, and the reading head 32 is positioned over the desired character. A drive motor 35 is turned on, and the drum 31 is kept rotating during the time necessary to send the message. The reading head 32 follows the selected track and transduces the information to produce a combined-frequency electrical output which is amplified at 36.

A timing device 37 is activated by closing a switch 40 momentarily to cause the transmission of one character over a communications link 38 to a local amplifier 39 coupled to the printing mechanism. The signals for the timer 37 are taken from a special timing track 42 on the drum 31 by a special reading head 41, the timer controlling the opening and closing of the transmitting gate so that only one character is transmitted at a time.

When the printing mechanism of FIG. 2 or 3 is coupled to the local amplifier 39, the electromagnet 15 is energized at specific frequencies. The reeds 10a–10f responsive to these frequencies vibrate for a specific time and in a specific relationship with respect to each other causing their associated styluses to print the particular character on the carrier 18. Similarly, if the printing mechanism of FIG. 4 is coupled to amplifier 39, each of the tuned coils responds to a predetermined frequency of the transmitted information to resonate and to produce a peak voltage to act as a tickler to close the corresponding switch activating the corresponding stylus to print a character in accordance with the spaced relationship of the respective styluses. The succeeding characters are transmitted in the same manner.

Figure 7:
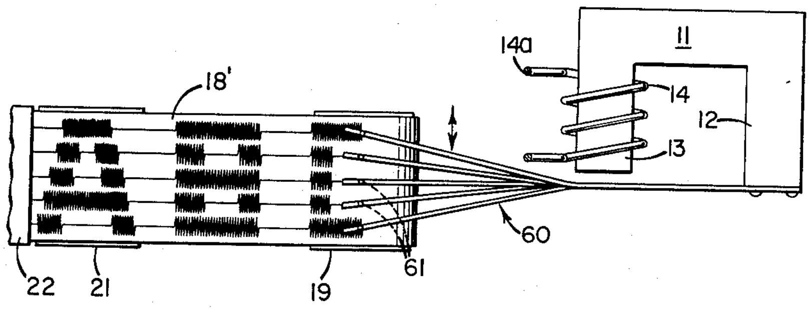
FIG. 7 is a plan view of a modified form of the printer shown in FIG. 1.
Figure 8:
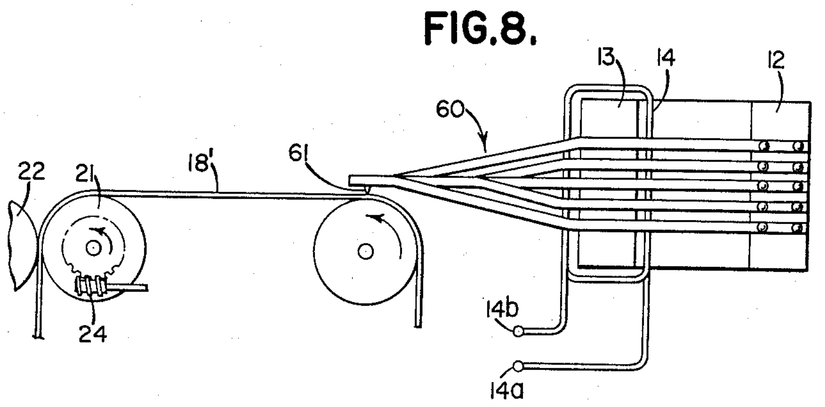
FIG. 8 is a view in elevation of the printer shown in FIG. 7.

In FIGS. 7 and 8 of the drawings, the reeds, indicated by the numeral 60, vibrate transversely relative to the movement of the carrier 18 since the magnetic core 11 and the carrier 18 are turned approximately 90° relative to each other from the position shown in FIG. 1. The styluses 61 are in continuous contact with the carrier 18 in this arrangement, and thus, straight lines are traced between characters.

Upon selective energization of the reeds, marks are created by the excursions of the styluses to each side of the usual straight lines. As in the previously described forms of the invention, the frequency of the energization signal determines which of the styluses vibrate.

By forming an edge on the ends of the styluses rather than a point and forming these edges so that they extend substantially parallel with the direction of movement of the carrier, the excursions create relatively broad marks. Also by varying the length of each edge in accordance with the frequency at which the respective reeds vibrate, the variation in tracing the usually resulting sinusoidal lines is offset substantially.

While the foregoing description sets forth the principles of the invention in connection with specific apparatus, it is to be understood that this description is made only by way of example and not as a limitation of the scope of the invention as set forth in the accompanying claims, since it may be desirable to modify the device to meet special situations. For example the selection of the character patterns on the drum may be performed by means of a keyboard in conjunction with a plurality of fixed reading heads, one for each character to be selected. The selection of a character then may be performed by means of a relay or other switching networks.

The prerecording or creation of the character patterns also may be done in a variety of ways other than by prerecording them in tracks on a drum. For instance, relay networks may be utilized which select the pattern required for each vibrating reed at the moment of writing and mix the separate patterns only at the time of transmittal. The individual reed patterns may also be controlled by commutator drums, photoelectric scanning discs or other means.

Other modifications could provide for the multiplexing of the printing devices in instances where the pattern is deciphered in a central location and distributed over sets of individual wires, one set being provided for each stylus to simplify the printing devices. These devices would consist of only the tape transporting mechanism and a set of styluses engaging the carrier. The desired one of the writing devices would be activated by connecting it remotely to a common trunk line. Furthermore, each stylus may be doubled or tripled to permit double or triple lines to be printed or to enhance the darkness of the marks.

What is claimed is:

1. A frequency responsive printing mechanism comprising a plurality of frequency responsive printing elements, each of said frequency responsive printing elements being tuned to resonate at a predetermined frequency, carrier means adapted to move a material past said printing elements, said printing elements being adapted to mark said material when excited at their resonant frequency, and signal input means coupled to said frequency responsive printing elements, said signal input means being adapted to receive an input signal containing a plurality of frequencies and being operable to apply said frequencies to each of said frequency responsive printing elements, thereby exciting selected frequency responsive printing elements at their resonant frequencies in accordance with the frequency composition of said input signal to produce a predetermined pattern of marks on said material.

2. The combination defined in claim 1 and also including an additional frequency responsive element coupled to said signal input means, said additional frequency responsive element being tuned to resonate at a predetermined frequency, switch means coupled to said additional frequency responsive element, said switch means being adapted to be actuated when said additional frequency responsive element is excited at its resonant frequency, carrier control means coupled between said switch means and said carrier means, said carrier control means being adapted to energize said carrier means in response to the actuation of said switch means, thereby moving said material past said printing elements when the frequency corresponding to said additional frequency responsive element is present in said input signal.

3. The combination defined in claim 1 wherein said frequency responsive printing elements are positioned in a row extending transversely with respect to the direction of motion of said material in close proximity to the adjacent printing elements such that simultaneous excitation of adjacent frequency responsive elements produces a recognizable composite mark on said material.

4. The combination defined in claim 1 wherein each of said frequency responsive printing elements comprises a mechanically resonant element, each of said mechanically resonant elements containing a ferro-magnetic material and being adapted to vibrate in response to an alternating magnetic field applied to said ferro-magnetic material thereof, each of said mechanically resonant elements being tuned to a mechanical resonant frequency and being adapted to vibrate with maximum amplitude in response to an alternating magnetic field of the same frequency, a printing member attached to each of said mechanically resonant element, said mechanically resonant elements being positioned with respect to said material such that said printing members mark on said material when the corresponding mechanically resonant element is vibrating with maximum amplitude, and wherein said signal input means comprises an electromagnet having an input winding wound on a ferro-magnetic core, said ferro-magnetic core being adapted to apply an alternating magnetic field to the ferro-magnetic material of each of said mechanically resonant elements in accordance with electrical signals applied to the input winding thereof.

5. A character printing system comprising a frequency responsive printing mechanism such as defined in claim 2, said first mentioned frequency responsive printing elements thereof being positioned in a row extending transversely with respect to the direction of motion of said material in close proximity to the adjacent printing elements such that simultaneous excitation of adjacent frequency responsive printing elements produces a recognizable composite mark on said material, function generator means adapted to produce a plurality of output signals each containing a plurality of frequencies and each adapted to produce a corresponding character mark on said material when applied to said signal input means of said frequency responsive printing mechanism, each of said output signals containing a frequency component corresponding to the resonant frequency of said additional frequency responsive element, the output signals of said function generator means being coupled to said signal input means of said frequency responsive printing mechanism, and character selection means coupled to said function generator means, said character selection means being operable to switch the output signals of said function generator in time sequence to mark a desired sequence of characters on said material.

6. The combination defined in claim 5 wherein said function generator means comprises a multiple channel recording device, each channel of said recording device having recorded thereon a plurality of frequencies adapted to produce a corresponding character mark on said material when applied to said signal input means of said frequency responsive printing mechanism, and wherein said character selection means comprises a switching circuit adapted to couple said recording device channels to said signal input means one at a time in a predetermined time sequence.

7. In an apparatus of the type in which characters are formed upon a recording medium by means of a configuration of marks, a character forming device comprising a plurality of mark forming elements arranged adjacent one another and adapted to contact said recording medium, said elements having inherent oscillating characteristics differing from one another, means for selectively oscillating one or a plurality of said mark forming elements simultaneously in accordance with their respective inherent oscillatory characteristics to cause selected ones of said elements to contact said recording medium, and means for moving said recording medium as said mark forming elements are oscillating.

8. The invention recited in claim 7 wherein each of said mark forming elements includes printing means for cooperating with said recording medium.

9. Apparatus for printing comprising a support member, a plurality of mark forming elements mounted on said support member, each of said elements being oscillatable at a different predetermined frequency, and common electromagnetic means cooperatively associated with said elements for inducing oscillations at their respective predetermined frequencies in accordance with a data pattern to be reproduced.

10. In a printer apparatus a print mechanism comprising in combination a plurality of print elements, said print elements being independently operable for producing a mark on a print medium, each of said print elements being activatable at a different activating frequency to perform a print function, and means for selectively activating said print elements with various activating frequencies in accordance with a data pattern to be produced.

11. In a printing apparatus having means forming a print couple comprising a print medium and a marking medium, the combination comprising printing means operable on said print couple for producing a mosaic pattern on said print medium including a plurality of oscillatable impression making members, said impression making members being individually oscillatable at a different frequency, and means for selectively energizing said impression making members at their respectively different frequencies in accordance with a data pattern to be reproduced.

References Cited in the file of this patent

UNITED STATES PATENTS

| | | |
|---|---|---|
| 309,600 | Brooks | Dec. 23, 1884 |
| 365,103 | Selden | June 21, 1887 |
| 1,914,043 | Ricchiardi | June 13, 1933 |
| 2,143,875 | Hansell | Jan. 17, 1939 |
| 2,170,132 | Eitzen | Aug. 22, 1939 |
| 2,779,654 | Williamson | Jan. 29, 1957 |
| 2,863,711 | Hurvitz | Dec. 9, 1958 |